US012633469B2

(12) United States Patent
Graskowski et al.

(10) Patent No.: US 12,633,469 B2
(45) Date of Patent: May 19, 2026

(54) CONTACT FOR A VACUUM INTERRUPTER AND PRODUCTION METHOD FOR SUCH A CONTACT

(71) Applicant: Siemens Aktiengesellschaft, Munich (DE)

(72) Inventors: Frank Graskowski, Wandlitz (DE); Uwe Jahnke, Oberlungwitz (DE); Denis Donner, Berlin (DE); Thomas Brauner, Berlin (DE); Klaus Oberndörfer, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 378 days.

(21) Appl. No.: 18/029,442

(22) PCT Filed: Sep. 17, 2021

(86) PCT No.: PCT/EP2021/075722
§ 371 (c)(1),
(2) Date: Mar. 30, 2023

(87) PCT Pub. No.: WO2022/069263
PCT Pub. Date: Apr. 7, 2022

(65) Prior Publication Data

US 2023/0368986 A1 Nov. 16, 2023

(30) Foreign Application Priority Data

Sep. 30, 2020 (DE) ..................... 10 2020 212 397.7
Nov. 17, 2020 (DE) ..................... 10 2020 214 421.4

(51) Int. Cl.
*H01H 1/025* (2006.01)
*H01H 1/02* (2006.01)
(Continued)

(52) U.S. Cl.
CPC .......... *H01H 1/0203* (2013.01); *H01H 1/025* (2013.01); *H01H 1/04* (2013.01); *H01H 11/041* (2013.01)

(58) Field of Classification Search
CPC ....... H01H 33/66207; H01H 33/66261; H01H 1/0203; H01H 1/58; H01H 11/04;
(Continued)

(56) References Cited

U.S. PATENT DOCUMENTS 6,574,864 B1 * 6/2003 Meissner ............. H01H 33/664 29/877
8,302,303 B2 * 11/2012 Gentsch ............... H01H 33/664 29/874
2016/0141119 A1 5/2016 Li et al.

FOREIGN PATENT DOCUMENTS

CN 205282375 U 6/2016
DE 19632573 A1 2/1998
(Continued)

*Primary Examiner* — Ahmed M Saeed
(74) *Attorney, Agent, or Firm* — Laurence A. Greenberg; Werner H. Stemer; Ralph E. Locher

(57) ABSTRACT

A contact for a vacuum interrupter of a low, medium or high-voltage switchgear includes a contact rod composed of a first electrically conductive material and extending along a longitudinal axis of the contact, and a contact piece composed of a second electrically conductive material and fastened to an end face of the contact rod. The contact rod and the contact piece are materially bonded to one another at a connecting face. At least one of the contact rod or the contact piece has a wall which delimits the connecting face, rises perpendicularly to the longitudinal axis and is disposed such that the contact piece and the contact rod are also force-lockingly connected to one another by a force acting transversely to the longitudinal axis between the contact piece and the contact rod. A production method for such a contact is also provided.

11 Claims, 5 Drawing Sheets

(51) Int. Cl.
*H01H 1/04* (2006.01)
*H01H 11/04* (2006.01)

(58) Field of Classification Search
CPC ...... H01H 33/66; H01H 33/668; H01H 1/025; H01H 1/04; H01H 11/041; H01H 1/0231; H01H 11/045; H01H 11/06; H01H 2011/062; H01H 33/6643
See application file for complete search history.

(56) References Cited

FOREIGN PATENT DOCUMENTS

| | | | |
|---|---|---|---|
| DE | 19921475 | A1 | 11/2000 |
| EP | 1022760 | A2 | 7/2000 |
| WO | WO 2017036711 | A1 | 3/2017 |

* cited by examiner

CONTACT FOR A VACUUM INTERRUPTER AND PRODUCTION METHOD FOR SUCH A CONTACT

FIELD AND BACKGROUND OF THE INVENTION

The invention relates to a contact for a vacuum interrupter of a low-, medium- or high-voltage switchgear, and to a production method for such a contact.

In low-, medium- and high-voltage switchgear, vacuum interrupters are used in order to as largely as possible suppress the occurrence of arcs when currents are switched, or to extinguish the arcs as quickly as possible. When switching occurs, a movable contact is either removed from a mating contact (opening of the switch) or brought together with the mating contact (closing of the switch). Each contact here consists of a contact piece, which establishes physical and thus also electrical contact with a corresponding mating piece of the other contact, and a contact rod, which acts as electrical feeder or arrester. The contact piece usually has a larger cross section than the contact rod to the end of which it is fastened, in order to increase the contact surface area that is exposed to load by an arc and to distribute the loading correspondingly over a larger surface area. Owing to the nevertheless high load applied by the arc, mechanically and chemically resistant materials are selected for the contact piece, but these materials are associated with high costs. By contrast, for the contact rod, the price and good electrical conductivity are paramount. The contact piece and the contact rod are therefore manufactured separately and connected to one another when a contact is being produced.

However, the connection between the contact rod and the contact piece is subject to high mechanical loading during operation of the vacuum interrupter, since the switch is closed as quickly as possible and the contacts thus impact against one another at high speed, in order to keep the time during which an arc can occur as short as possible. For this reason, it is desirable to connect the contact rod and the contact piece to one another as fixedly as possible with high reliability.

In the course of producing a vacuum interrupter, frequently the components of the vacuum interrupter are first of all placed in a vacuum soldering furnace while connected detachably to one another or else one on top of the other without being connected, the vacuum soldering furnace is evacuated and the loose or detachable components of the vacuum interrupter are connected fixedly to one another by heating, with a vacuum being present inside the vacuum interrupter. In the process, either prefabricated contacts or contact rods and pieces that are likewise detachably or loosely connected to one another can be fitted, in the latter case the necessary fixed connection between contact rods and pieces being brought about only by the heating in the vacuum soldering furnace. In both cases, the quality of the connection between the contact piece and the contact rod cannot be inspected after the manufacture has been completed, since the contact is inside the finished vacuum interrupter.

SUMMARY OF THE INVENTION

The invention is based on the object of introducing an improved contact and a method for producing it.

The invention achieves this object by a contact and a method as described below. Preferred embodiments of the invention form the subject matter of the dependent claims.

A first aspect of the invention relates to a contact for a vacuum interrupter of a low-, medium- or high-voltage switchgear. The contact comprises a contact rod, which extends along a longitudinal axis of the contact and comprises a first electrically conductive material, and a contact piece, which is fastened to an end face of the contact rod, comprises a second electrically conductive material, and has a contact face remote from the contact rod. The contact rod and the contact piece are materially bonded to one another on a connecting face. According to the invention, at least one of the contact rod and contact piece has a wall or dam that delimits the connecting face, rises perpendicularly to the longitudinal axis, and is arranged such that the contact piece and the contact rod are also connected to one another in a force-locking connection as a result of a force acting transversely to the longitudinal axis between the contact piece and the contact rod.

The force-locking connection between the contact rod and the contact piece advantageously has the effect that the two components can be positioned correctly in relation to one another before the material bond is produced, and the force-locking connection holds the two components in the desired position while the material bond is being produced. This prevents the components from slipping in relation to one another and achieves a material bond of high quality.

For example, a wall can be arranged on a lateral surface of the contact rod so that the wall presses against an inner face of a cutout in the contact piece, the cutout at least approximately complementing that end of the contact rod that is pressed in the contact disk, and thus brings about the force-locking connection between the contact piece and the contact rod. Similarly, the wall can also be arranged on that inner face of the contact piece that faces toward the lateral surface of the contact rod, with the contact rod being inserted into the space enclosed by the wall in order to produce the force-locking connection. Of course, it is also possible to provide walls on both the contact rod and the contact piece, in order to increase the stability of the force-locking connection. It is also possible to provide multiple walls on the contact rod and/or the contact piece.

A wall preferably runs along a closed line, in particular along a circular line. This means that each portion of the wall is subject to load with the same force.

Particularly preferably, the contact rod and the contact piece are soldered to one another, that is to say the material bond between the contact rod and the contact piece is produced by soldering, in particular brazing. In this regard, solder can be placed in the space enclosed between the contact rod and the contact piece as coating of the contact piece and/or contact rod, as soldering film or in some other form, before the force-locking connection and, lastly, the material bond are produced. The wall or the walls here provide the additional advantage that they form a barrier to the solder that liquefies during the production of the material bond and keep it in the desired location.

Particularly preferably, the wall runs concentrically around the longitudinal axis. This makes the action of force on the wall uniform in all directions, and therefore the contact rod is centered relative to the contact piece when the force-locking connection is being produced.

In advantageous embodiments of the contact according to the invention, there is provided a trench which runs at least approximately parallel to the wall and is arranged on a side of the wall that is remote from the contact face of the contact piece. If there are multiple walls, a corresponding trench can be provided next to each of the walls. The trench has the advantage that material of the adjacent wall can enter the trench, or can be received in it, by deformation when the force-locking connection is being produced. For this reason, the trench is also arranged on that side of the wall that is remote from the contact face of the contact piece. The presence of a trench makes it possible to produce a force-locking connection of high quality, without it being necessary to exert an excessively high pressing force in the process. The volume of a trench preferably corresponds to at least half of the volume of the adjacent wall. For example, it can be at least approximately the same as the volume of the adjacent wall, or else even greater.

The contact piece can have a passage which has a first opening and a second opening, wherein the first opening is open toward the contact face of the contact piece and wherein the second opening is open toward a side of the contact piece that is remote from the contact face of the contact piece. The passage has the advantage that air trapped between the contact piece and the contact rod can escape when the force-locking connection is being produced and lastly also when the vacuum soldering furnace is being evacuated, this reducing the pressing force necessary to produce the force-locking connection and increasing the quality of the material bond between the contact piece and the contact rod. The contact rod may, for example, have a formation arranged in the passage in the contact piece. The formation can increase the surface area available for the production of the force-locking connection.

As an alternative or in addition to the passage in the contact piece, it is also possible for the wall to have at least one passage which has a first opening leading into a space surrounded by the contact piece and the end face of the contact rod and a second opening leading into a surrounding area of the contact. The passage has the effect that air trapped between the contact piece and the contact rod can escape while the vacuum soldering furnace is being evacuated, with the result that a disruptive pressure effect of this air while the vacuum soldering furnace is being heated can be avoided. The at least one passage can be closed by solder during the production of the material bond between the contact piece and the contact rod, but is still able to be detected in the finished product on account of the different types of materials used for the wall and solder. The passage can, for example, be in the form of a through-hole or a slot reaching to the top of the wall.

For example, the wall may have a plurality of such passages, which are at least approximately equidistant from one another. As a result, the same mechanical properties, such as flexibility and deformability of the wall, are obtained along the wall.

Particularly preferably, a first coefficient of thermal expansion of the first material is greater than a second coefficient of thermal expansion of the second material. This has the effect that the force applied to bring about the force-locking connection increases during the heating, with the result that the force-locking connection can be produced with a low expenditure of force and becomes all the more reliable and robust during the production of the material bond.

The first material may be copper, stainless steel, or a copper or stainless steel alloy. The second material may be a copper-chromium composite material, a tungsten-copper compound, or a tungsten carbide-metal compound, such as tungsten carbide-silver or tungsten carbide-copper.

A second aspect of the invention relates to a method for producing a contact according to the invention. It has at least the following steps:

providing the contact rod;

providing the contact piece;

connecting the contact rod and the contact piece in a force-locking connection by applying a pressing force along the longitudinal axis; and materially bonding the contact rod and the contact piece by heating the contact rod and the contact piece.

For example, solder can be placed between the contact rod and the contact piece before the force-locking connection is produced. The particular embodiments of the contact that are described above can readily be transferred to corresponding embodiments of the production method according to the invention.

BRIEF DESCRIPTION OF THE FIGURES

The invention will be explained in more detail below with reference to drawings of exemplary embodiments.

DETAILED DESCRIPTION OF THE INVENTION

Figure 1:
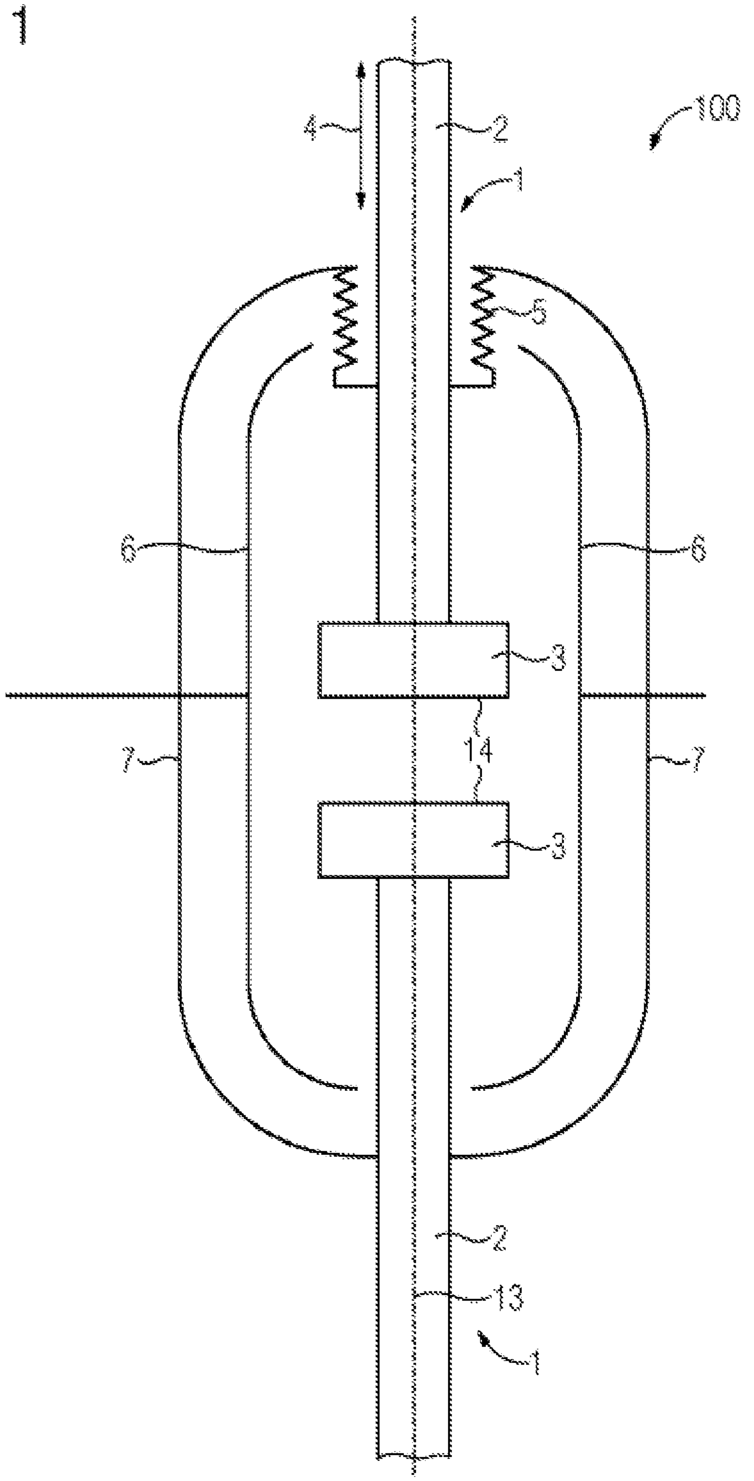
FIG. 1 shows a sectional illustration through an example of a vacuum interrupter in which a contact according to the invention can be used.

FIG. 1 shows a sectional illustration through an example of a vacuum interrupter 100 in which a contact 1 according to the invention can be used. The vacuum interrupter 100 comprises two contacts 1, which are arranged opposite one another in a ceramic housing 7 and of which usually one is in the form of a movable contact and the other is in the form of a fixed contact. In this respect, the movable contact can be displaced along a movement direction 4 within the vacuum interrupter 100, with the result that respective contact faces 14 of the two contacts 1 can be brought into contact with one another or separated from one another. In this respect, a flexible bellows 5 ensures that the vacuum prevailing in the vacuum interrupter 100 is maintained in spite of the movement of the movable contact.

Each contact 1 comprises a contact rod 2, which extends along a longitudinal axis 13, and a contact piece 3, which is fastened to one end of the contact rod 2 and has the opposite contact faces 14. A shield 6 serves to protect the underlying ceramic from being sputtered by contact material from switching arcs and possibly to take on a potential lying between the potentials of the contacts 1, as a result of which the electrical field prevailing in the vacuum interrupter 100 can be advantageously influenced.

Figure 2:
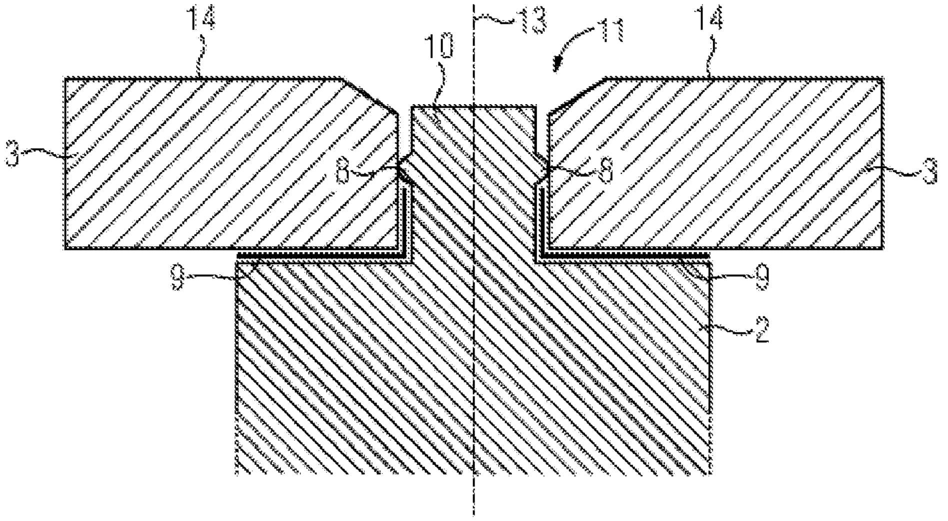
FIG. 2 shows a sectional illustration through a first exemplary embodiment of a contact according to the invention.

FIG. 2 shows a sectional illustration through a first exemplary embodiment of a contact 1 according to the invention. The contact rod 2 of the contact 1 has a formation 10, which is introduced in a correspondingly shaped passage 11 in the contact piece 3. The formation 10 may in particular be cylindrical. The passage 11 has the additional advantage that gas located between the contact rod 2 and the contact piece 3 can escape when the vacuum soldering furnace is being evacuated. If gas remains in the vacuum soldering furnace, undesired chemical reactions can occur on the surfaces of the contact 1 and inside the vacuum interrupter 100. Moreover, trapped gas can prevent the formation of a material bond of sufficient quality.

According to the invention, what is provided is a wall 8 which, in the exemplary embodiment shown here, is arranged on the contact rod 2 and, more specifically, on the formation 10 of the contact rod 2. The wall 8 encircles the formation 10 and can thus constitute a ring around it. The ring can in particular be arranged concentrically around the longitudinal axis 13 of the contact 1. The wall 8 serves to produce a force-locking connection between the contact rod 2 and the contact piece 3, before subsequently a material bond is produced. The force-locking connection holds the contact piece 3 and the contact rod 2 in the desired position relative to one another to establish the materially bonded position. For the latter, solder 9, for example a solder film, can be placed between the contact rod 2 and the contact piece 3 at the location where the material bond is to be brought about on a connecting face of the two parts. The wall 8 serves in this respect as a boundary of the connecting face, since the solder 9 heated and liquefied during the production of the material bond cannot pass the wall 8. This prevents the liquefied solder 9 from leaving the region of the connecting face, which if it does happen can result in the quality of the material bond being adversely affected and the contact face 14 of the contact piece 3 being contaminated with solder.

Figure 3:
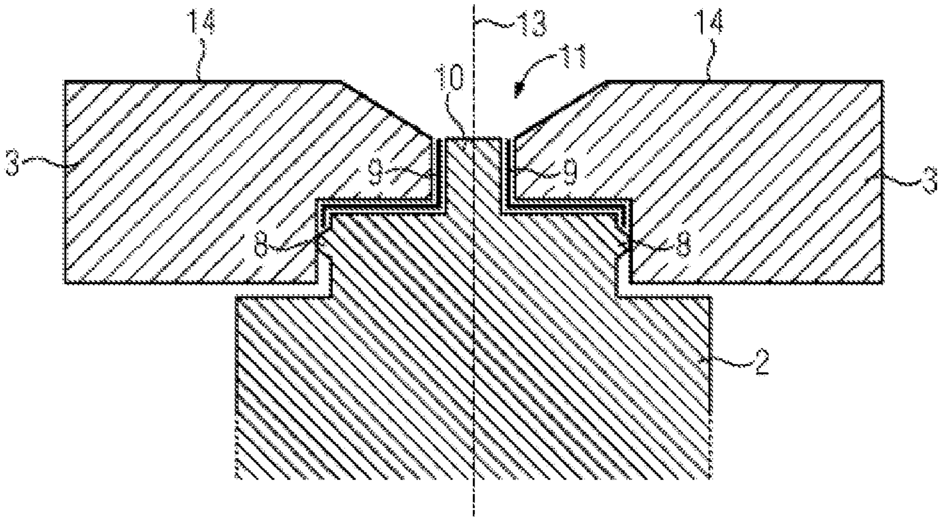
FIG. 3 shows a sectional illustration through a second exemplary embodiment of a contact according to the invention.

FIG. 3 shows a sectional illustration through a second exemplary embodiment of a contact 1 according to the invention. In the second exemplary embodiment, that end of the contact rod that is connected to the contact piece 3 has a stepped form. In the second embodiment, the wall 8 delimits the connecting face on its other side. The first and the second exemplary embodiment can advantageously be combined in one vacuum interrupter 100, when the upper contact is implemented according to the first exemplary embodiment and the lower contact is implemented according to the second exemplary embodiment, since, in the event of the vacuum interrupter 100 being placed upright in the vacuum soldering furnace, the solder 9 can be kept at the intended location against the action of gravitational force for both contacts.

Figure 4:
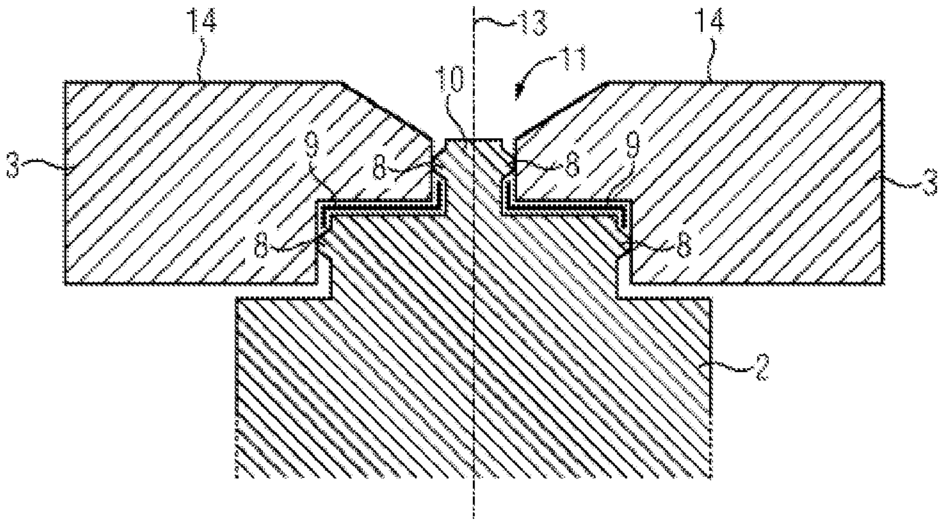
FIG. 4 shows a sectional illustration through a third exemplary embodiment of a contact according to the invention.

FIG. 4 shows a sectional illustration through a third exemplary embodiment of a contact 1 according to the invention, in which two walls 8 are provided, as a result of which the robustness of the force-locking connection is increased. The arrangement of the walls 8 of the exemplary embodiment shown here additionally has the effect that they delimit the connecting face on both sides, so that the solder 9 cannot leave the space delimited by the walls 8 and therefore the connecting face at which the material bond comes into being is clearly defined.

Figure 5:
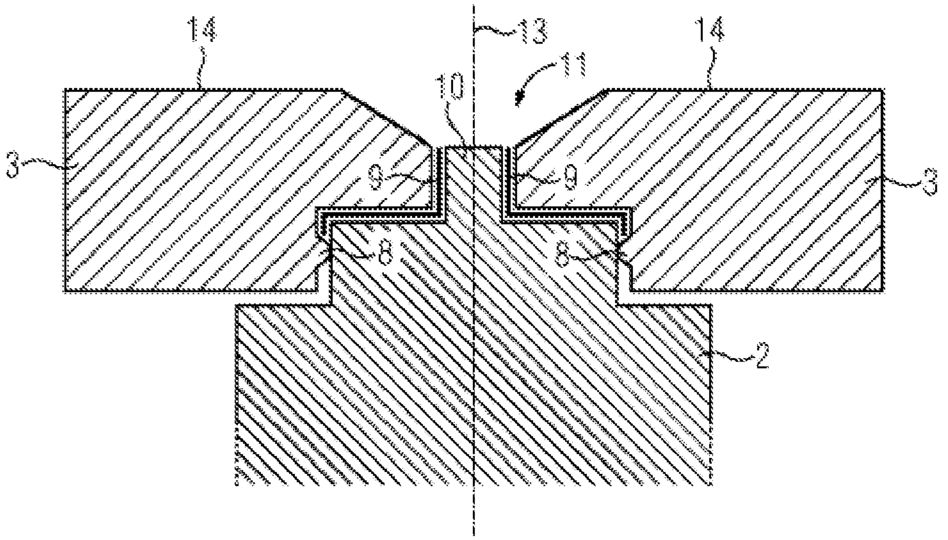
FIG. 5 shows a sectional illustration through a fourth exemplary embodiment of a contact according to the invention.

FIG. 5 shows a sectional illustration through a fourth exemplary embodiment of a contact 1 according to the invention, which largely corresponds to the second exemplary embodiment of FIG. 3. The difference between the two exemplary embodiments is that here, the wall 8 is not arranged on the contact rod 2 but on the contact piece 3. In principle, a wall 8 can be arranged on the contact rod 2 or the contact piece 3 in all embodiments of the invention. It is also possible to provide one or more walls both on the contact rod 2 and the contact piece 3. In general, however, the material of the contact rod 2 is softer and more flexible than that of the contact piece 3, and therefore a wall 8 on the contact rod 2 allows production of the force-locking connection with a lower pressing force.

Figure 6:
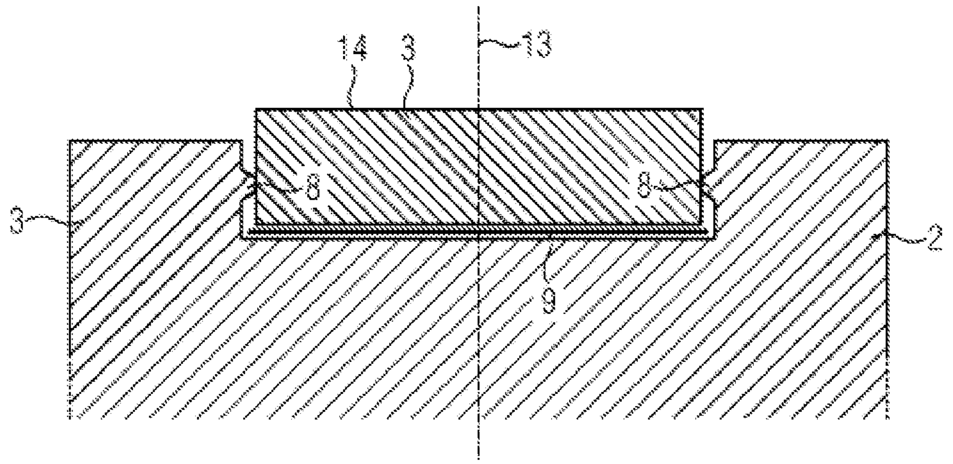
FIG. 6 shows a sectional illustration through a fifth exemplary embodiment of a contact according to the invention.

FIG. 6 shows a sectional illustration through a fifth exemplary embodiment of a contact 1 according to the invention, in which the contact piece 3 is inset in the contact rod 2. Such an embodiment can be selected when the coefficient of thermal expansion of the material of the contact piece 3 is greater than that of the material of the contact rod 2. As a result, the contact piece 3 expands during heating to a greater extent than the contact rod 2 does, and therefore the robustness of the force-locking connection is temporarily increased in the course of the production of the material bond. This makes it possible to produce the force-locking connection with a relatively small force, with a larger force acting during the soldering operation and holding the contact piece 3 and contact rod 2 in the desired position relative to one another.

Figure 7:
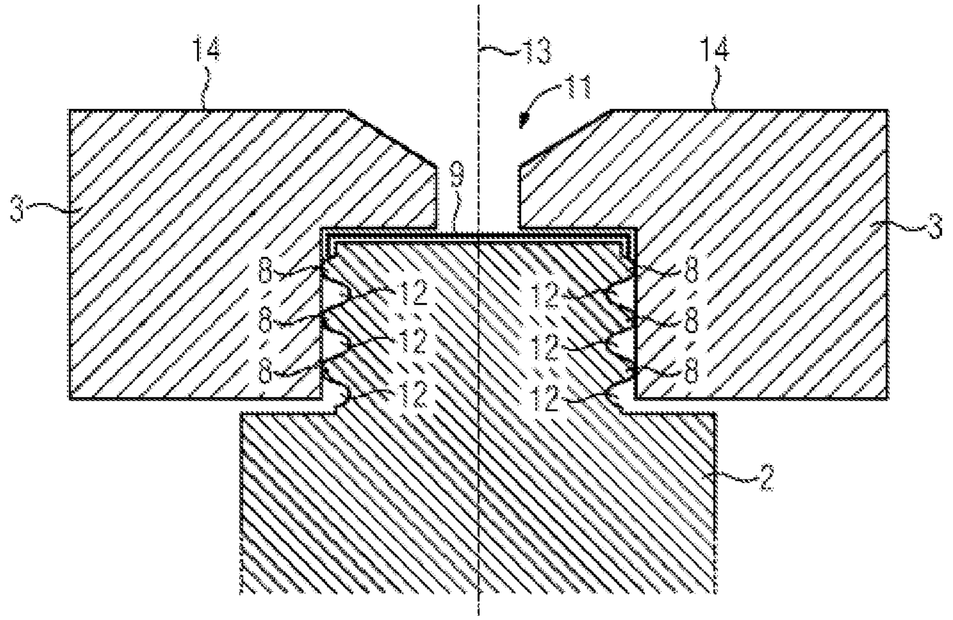
FIG. 7 shows a sectional illustration through a sixth exemplary embodiment of a contact according to the invention.

FIG. 7 shows a sectional illustration through a sixth exemplary embodiment of a contact 1 according to the invention, in which there are provided multiple walls 8 which, however, by contrast with the exemplary embodiment of FIG. 4, all delimit the connecting face at the same end. Such arrangements of walls 8 are, of course, also possible in the other embodiments shown. In the sixth exemplary embodiment, trenches 12, each of which runs next to one of the walls 8, are additionally provided. Here, each trench 12 is arranged on that side of the associated wall 8 that is remote from the contact side 14. This has the advantage that the wall 8 becomes flexible and some of the material of the wall 8 can be displaced into the associated trench 12 when the force-locking connection is being produced, as a result of which, for the one part, the contact surface area of the force-locking connection is increased and at the same time the maximum contact pressure of the force-locking connection is reduced and advantageously distributed over the surface area. This makes it possible to realize a better force-locking connection while applying a reduced pressing force. Of course, such a trench 12 or multiple trenches 12 can also be provided in the other exemplary embodiments shown.

Figure 8:
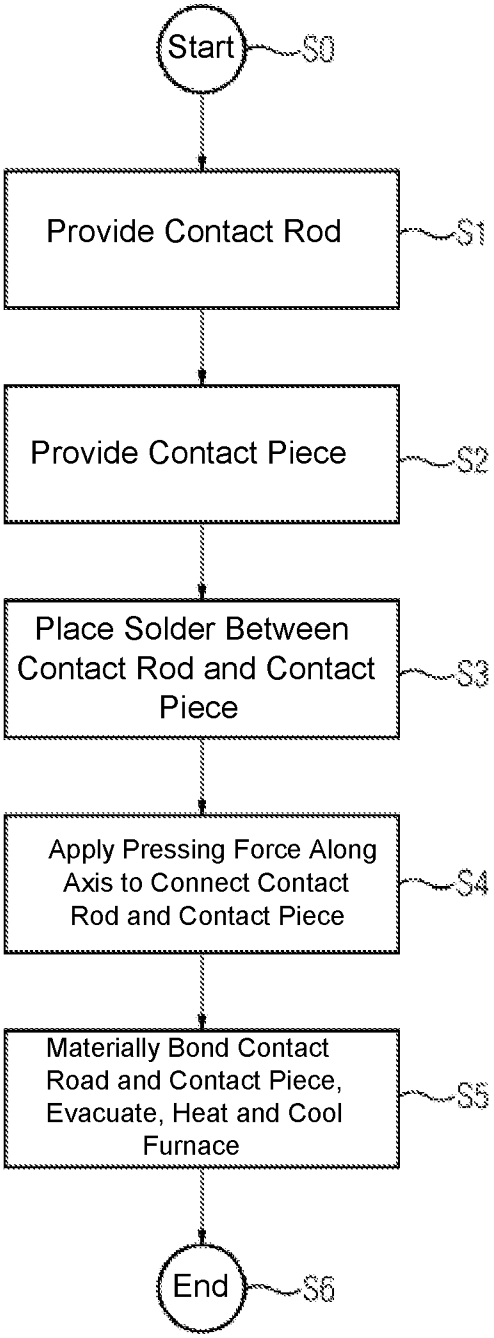
FIG. 8 shows one exemplary embodiment of the method according to the invention for producing a contact according to the invention.

FIG. 8 shows an exemplary embodiment of the method according to the invention for producing a contact according to the invention, which method begins with a starting step S0 and continues with a step S1, in which a contact rod is provided. In step S2, a matching contact piece is provided. In step S3, solder is placed between the contact rod and the contact piece. Steps S1, S2 and S3 can generally be carried out in any desired sequence or at the same time. Then, in step S4, the contact rod and contact piece are connected in a force-locking connection by applying a pressing force along the longitudinal axis. In step S5, the contact rod and contact piece are materially bonded, and this operation can comprising sub-steps of evacuating a vacuum soldering furnace and heating the vacuum soldering furnace. The method ends with a final step S6 after cooling down the vacuum soldering furnace and finishing the contact.

The invention has been explained in more detail on the basis of drawings of exemplary embodiments. The exemplary embodiments serve merely for better understanding in this respect and are not intended to have a limiting effect on the invention defined exclusively by the following patent claims.

LIST OF REFERENCE SIGNS

1 Contact
2 Contact rod
3 Contact piece
4 Movement direction
5 Bellows
6 Shield
7 Ceramic housing
8 Wall
9 Solder
10 Formation
11 Passage
12 Trench
13 Longitudinal axis
14 Contact face
100 Vacuum interrupter

The invention claimed is:

1. A contact for a vacuum interrupter of a low, medium or high-voltage switchgear, the contact comprising:

a contact rod extending along a longitudinal axis of the contact and having a first electrically conductive material and an end face;

a contact piece fastened to said end face of said contact rod, said contact piece having a second electrically conductive material and a contact surface remote from said contact rod;

said contact piece and said contact rod being materially bonded to one another on a connecting face; and at least one of said contact rod or said contact piece having a dam running along a closed circular line, said dam configured to delimit said connecting face, rise perpendicularly relative to said longitudinal axis and force-lockingly interconnect said contact piece and said contact rod due to a force acting transversely to said longitudinal axis between said contact piece and said contact rod.

2. The contact according to claim 1, wherein said contact rod and said contact piece are soldered to one another.

3. The contact according to claim 1, wherein said dam runs concentrically around said longitudinal axis.

4. The contact according to claim 1, which further comprises a trench running at least approximately parallel to said dam, said trench disposed on a side of said dam remote from said contact face of said contact piece.

5. The contact according to claim 1, wherein said contact piece has a passage formed therein having a first opening and a second opening, said first opening being open toward said contact face of said contact piece and said second opening being open toward a side of said contact piece remote from said contact face of said contact piece.

6. The contact according to claim 5, wherein said contact rod has a formation disposed in said passage formed in said contact piece.

7. The contact according to claim 1, wherein a first coefficient of thermal expansion of the first material is greater than a second coefficient of thermal expansion of the second material.

8. The contact according to claim 1, wherein the first material is copper, stainless steel, or a copper or stainless steel alloy.

9. The contact according to claim 1, wherein the second material is a copper-chromium composite material, a tungsten-copper compound, or a tungsten carbide-metal compound.

10. The contact according to claim 1, wherein:

the first material is copper, stainless steel, or a copper or stainless steel alloy; and the second material is a copper-chromium composite material, a tungsten-copper compound, or a tungsten carbide-metal compound.

11. A method for producing a contact, the method comprising steps of:

producing the contact according to claim 1 by:

providing said contact rod;

providing said contact piece;

force-lockingly interconnecting said contact rod and said contact piece by applying a pressing force along the longitudinal axis; and materially bonding said contact rod and said contact piece to each other by heating said contact rod and said contact piece.

* * * * *